United States Patent [19]

Naiman et al.

[11] Patent Number: 4,708,993

[45] Date of Patent: Nov. 24, 1987

[54] COLD FLOW IMPROVER AND METHOD OF USE THEREOF

[75] Inventors: Michael I. Naiman, St. Louis; John A. Schield, Chesterfield; Lawrence J. Cunningham, Kirkwood, all of Mo.

[73] Assignee: Petrolite Corporation, St. Louis, Mo.

[21] Appl. No.: 893,850

[22] Filed: Aug. 6, 1986

[51] Int. Cl.$^4$ .............................................. C08F 8/22
[52] U.S. Cl. .................................... 525/356; 44/62; 44/70; 525/334.1; 525/386
[58] Field of Search .............. 44/62, 66, 70; 525/356, 525/386, 334.1

[56] References Cited

U.S. PATENT DOCUMENTS 4,471,098  9/1984  Naiman ........................... 525/334.1

Primary Examiner—William R. Dixon, Jr.
Assistant Examiner—Margaret B. Medley
Attorney, Agent, or Firm—Robert E. Wexler

[57] ABSTRACT

Oligomers of polymerizable ester-containing halopolyalkylenes are effective as cold flow improvers in middle distillate fuels.

15 Claims, No Drawings

COLD FLOW IMPROVER AND METHOD OF USE THEREOF

BACKGROUND OF THE INVENTION

1. Field of the Invention

This invention relates to cold flow improvers for use in middle distillate fuel oils and, more particularly, relates to cold flow improving oligomers of ester-containing halopolyalkylenes.

More particularly, the present invention relates to polymerizable ester-containing halopolyalkylenes obtained by replacing at least a portion of the halogens of the halopolyalkylenes with polymerizable ester groups, and to oligomers of such polymerizable ester-containing halopolyalkylenes.

In storage and use of heavy oils, such as lubricating oils, problems associated with cold flow have long been in existence and have been recognized in the art. Cold flow problems arise through the formation of solid or semi-solid waxy particles with an oil composition. For example, in the storage of furnace oils or diesel oils during the winter months, temperatures may decrease to a point as low as $-26°$ C. to $-40°$ C. The decreased temperatures often cause crystallization and solidification of wax in the distillate fuel oil.

Cold flow properties of an oil can be categorized as either pour-point properties or operability properties. The pour-point of an oil is defined as the lowest temperature at which the oil will pour or flow when chilled under specific conditions. The pour-point is reduced by reducing the amount of crystallization that occurs. The operability of an oil is defined as the temperature at which an oil will pass through a standardized filter in a set period of time. Thus, the operability of an oil can be improved by reducing the size of the crystals. Pour-point and operability problems also exist in the storage and use of distillate fuel oils, particularly at low temperatures.

2. Description of Prior Art

Chlorinated polyethylenes, ethylene-vinyl ester-type copolymers and ester-containing halopolyalkylenes have been employed as cold flow improvers for hydrocarbon fuels.

The following patent illustrates chlorinated polyethylenes used to improve cold flow:

U.S. Pat. No. 3,337,313

The following patents illustrate ethylene-vinyl ester-type copolymers used to improve cold flow:

U.S. Pat. No. 3,048,479
U.S. Pat. No. 3,093,623
U.S. Pat. No. 3,131,168

Often both types do not exhibit equal cold flow improving activity in the same fuel. One type may be effective in one type of fuel while the other may be effective in another type of fuel.

The following patents illustrate ester-containing halopolyalkylenes used to improve cold flow:

U.S. Pat. No. 4,568,726
U.S. Pat. No. 4,568,359
U.S. Pat. No. 4,554,327
U.S. Pat. No. 4,553,980
U.S. Pat. No. 4,544,712
U.S. Pat. No. 4,541,839
U.S. Pat. No. 4,536,191
U.S. Pat. No. 4,536,551

It has now been discovered that ester-containing halopolyalkylenes can be oligomerized to produce cold flow improvers which are more effective than known ester-containing halopolyalkylenes and which are unexpectedly more effective than an equivalent amount of the corresponding single-unit ester-containing halopolyalkylenes.

BRIEF SUMMARY OF THE INVENTION

This invention is concerned with polymerizable ester-containing halopolyalkylenes and with oligomers of such halopolyalkylenes. The term "oligomer" as utilized herein designates a polymeric composition of matter comprising from 2 to about 20 monomer units wherein each of the monomer units comprises an ester-containing halopolyalkylene of the present invention.

The polymerizable ester-containing halopolyalkylenes of this invention are produced by replacing at least some of the halogens or the halopolyalkylenes with ester groups wherein at least some of such ester groups include a polymerizable organic radical. These polymerizable ester-containing halopolyalkylenes are useful as intermediates for producing higher molecular weight ester-containing halopolyalkylenes and are particularly useful for producing the cold flow improving oligomers of the present invention.

The oligomers of this invention are produced by subjecting the polymerizable ester-containing halopolyalkylenes to free radical polymerization conditions in the presence of an effective gelation preventing amount of a chain transfer agent. These oligomers are particularly useful for improving the cold flow of middle distillate fuels.

DETAILED DESCRIPTION OF THE INVENTION

The Ester-Containing Halopolyalkylene Reactants

Polymerizable ester-containing halopolyalkylenes of the present invention are those wherein at least some of the ester groups include a polymerizable organic radical which is adapted to undergo polymerization under free radical polymerization conditions.

These polymerizable ester-containing halopolyalkylenes are prepared according to the general procedure for preparing non-polymerizable ester-containing halopolyalkylenes set forth in U.S. Pat. Nos. 4,568,726; 4,568,359; 4,554,327; 4,533,980; 4,544,712; 4,541,839; 4,536,551 and 4,536,191.

The starting compositions for the polymerizable ester-containing halopolyalkylenes are oil soluble halogen-containing low molecular weight polyalkylenes which are essentially free of crosslinking and preferably have a halogen content of not more than about 35% by weight. Polyalkylenes include polyethylenes and copolymers of ethylene with mono-olefinic hydrocarbons having, for example, 3–20 carbon atoms. The copolymers preferably have at least 50 mole percent ethylene.

The starting halopolyalkylenes are prepared from non-halogenated alkylene polymers which have an average molecular weight of at least about 1,000. They advantageously have average molecular weights in the range of about 1,000–12,000 and preferably, for the purposes of this invention, about 1,000–7,000. They are halogenated to a halogen content of not more than about 35% by weight of the polymer and the resulting halopolyalkylenes therefore have average molecular weights of about 1,000–16,000 and preferably about 1,000–9,500.

A very high average molecular weight in the polymer may adversely affect its solubility in the fuel oil. Therefore, polymers with very high molecular weights, such as those from a Ziegler process, are not considered suitable for producing cold flow improvers useful in fuel oil.

The average molecular weights of the above polymers may conveniently be determined by means of an embulioscope or an osmometer. Another method is by means of the intrinsic viscosity of the polymer (D-1601-59-T in decalin solvent at 135° C.).

As stated above, the alkylene polymers useful in the practice of the present invention include both polyethylene and copolymers of ethylene with mono-olefinic hydrocarbons having 3-20 carbon atoms, such copolymers having at least 50 mole percent ethylene. Avantageously, the polyalkylene (prior to halogenation) has a branch index (number of substituent groups per 100 carbon atoms) of not more than about 5. Advantageously, the copolymer is one of ethylene with propylene having (prior to halogenation) a branch index of at least about 6 and preferably about 6-20. A very advantageous polyalkylene is a polyethylene having a branch index of about 2-3 and a molecular weight of about 2,000. A very advantageous copolymer of ethylene and propylene is one having a branch index of about 10-14 and an average molecular weight of about 1,800.

When the alkylene polymers are halogenated, naturally the branch index is increased. However, in identifying the halogen-containing polymer it has been found more convenient to describe the halogen content of the new polymer in terms of weight percent.

For purposes of this invention, the alkylene polymers described herein have little, if any, crosslinking, although, as described above, they include branched polymers. Therefore, these polymers may be described as being essentially free of cross-linking.

The halopolyalkylenes usable in accordance with this invention are oil soluble. Generally, this means that they are completely soluble in distillate fuel oils in concentrations of at least about 10% by weight (slight haze is permissable) at room temperature (25° C.).

It is not always necessary that the non-halogenated polyalkylene starting material possess good oil solubility. To illustrate, a polyethylene having a lower order of oil solubility, a crystallinity of about 60-70, a branch index of about 2-3, and an average molecular weight of about 2,000 has been chlorinated to produce a chlorine-containing polymer having good oil solubility, together with exceptional cold flow improving properties.

Suitable polyalkylenes which may be halogenated are polyethylenes which are products or by-products of the peroxide catalyzed polymerization of ethylene. Polymerization of ethylene using peroxide catalysts is well known in the art. The low molecular weight polyethylene by-products are usually oily liquid hydrocarbon mixtures, hydrocarbon greases, or hydrocarbon waxes obtained in small quantities in the mass polymerization of ethylene at elevated temperatures and pressures using a free radical polymerization catalyst. Other low molecular weight polyethylene by-products include by-products from peroxide (or oxygen which forms peroxides) catalyzed polymerization of ethylene. Another example of a product which may be used is the homopolymer by-product described by J. W. Ragsdale, U.S. Pat. No. 2,863,850. Other such products are well known in the art.

The above-defined polyalkylenes comprising a copolymer of ethylene with a mono-olefinic hydrocarbon having from about 3-20 carbon atoms have at least about 50 mole percent ethylene. Mono-olefinic hydrocarbons include propylenes, butylenes, pentylenes, hexylenes, and up to 20 carbons, and mixtures thereof. Preferably, the mono-olefinic hydrocarbon is propylene. The copolymers are prepared by methods known in the art. Advantageously, the copolymer of ethylene with propylene is prepared by subjecting the combination to polymerization by peroxide catalyst or a tetraphenyl tin-aluminum chloride-vanadium tetrachloride catalyst system or a tetraalkyl lead-vanadium tetrachloride catalyst system.

Other polymers which may be halogenated in accordance herewith may be obtained by extraction of low molecular weight polymers having branch indexes hereinbefore defined. Extraction may be accomplished using a solvent or a solvent-antisolvent. The extracted polymer can be utilized if it falls within the definition of the polymers of this invention as to characteristics. Such extracted fraction usually has a higher branch index and a lower intrinsic viscosity than the starting material, as well as a high concentration of total solubility in distillate fuels and a lower crystallinity. Examples of suitable solvents are the low molecular weight hydrocarbons such as butane, pentane, hexane and heptane. Examples of antisolvents which can be utilized therewith are the low molecular weight alcohols such as methanol, ethyl alcohol, isopropyl alcohol and butanol. Naptha is a particularly advantageous solvent because it does not require the use of an antisolvent.

Because polymers having the desired characteristics are available commercially and because such polymers can be "tailor-made" to have the desired characteristics, it is particularly preferred to use such polymers which do not need prior extraction because extraction adds an expensive step to preparation of the polymers.

Polymers suitable for halogenation are described above and are well known in the art and readily available commercially. Many of the usable polymers suitable for halogenation are obtained as by-products from commercial polymerization processes as undesirable low molecular weight materials and because of their availability and economic attractiveness such by-product polymers are advantageous for use herein.

The halogenation of these polymers produces halopolyalkylenes having halogen substituents on the polymer chain. These halogen substituents increase the cold flow improving properties of the polymer. A preferred method of preparing the halopolyalkylenes (and thereby adding the halogen substituents onto the polymer chain) is carried out by treating one of the above-defined polyalkylenes with halogen under suitable reaction conditions to produce a halogenated polyalkylene. This process is carried out until the desired halogen content of the resulting polymer is reached. Usually this content is not more than about 35% by weight of the polymer. Increased amounts of halogen tend to lessen the cold flow improving properties of the polymer and, therefore, are not preferred.

Chlorination of polyalkylenes to produce chloropolyalkylenes may be carried out by one of several procedures. In one process, chlorine is bubbled through the molten polymer usually under temperature conditions of at least about 65.5° C., advantageously between 65° and 205° C. A second process is carried out by bubbling chlorine through the polymer suspended in an inert solvent, such as carbon tetrachloride (and other chlorinated methanes, ethanes, and the like), under temperature conditions of at least 24° C. The rate of reaction may be accelerated by using an actinis light source. A third process is carried out by bubbling chlorine through an aqueous suspension of the polymer. The first two processes are preferred since it is believed that in these reactions the chlorine contacts a greater portion of the inner polymer chain. It is to be understood that the chlorine addition includes the use of known chlorinating compounds such as sulfuryl chloride, oxalyl chloride, phosgene, and the like.

The chlorination is carried out to produce a chlorine-containing polymer having preferably less than about 35% chlorine by weight. Optimum chlorine contents are dependent somewhat on the particular polymer being chlorinated. To illustrate, a polyethylene having a branch index of not more than about 5 and a molecular weight of about 1,500–2,500 is preferably chlorinated to a chlorine content of about 10–30% by weight. More optimum cold flow improving properties result when the polyethylene has an average molecular weight of about 2,000, a branch index of about 2–3, and a chlorine content of about 16–23% by weight. Another illustration is a copolymer of ethylene and propylene having a branch index of about 6–20, an average molecular weight of about 1,500–2,000, and a chlorine content of about 4–13% by weight. More optimum cold flow improving properties are obtained when the copolymer has a branch index of about 10–14, an average molecular weight of about 1,800, and a chlorine content of about 8–11% by weight. More exact values for these ranges are dependent on the particular fuel oil being utilized.

It is contemplated that other halogens e.g. fluorine, bromine and iodine, may be substituted for chlorine and utilized as described above to produce other halopolyalkylenes.

The halopolyalkylenes are converted to ester-containing halopolyalkylenes by replacing at least some of the halogen groups with carboxylic groups so as to yield ester groups. Where at least some of the carboxylic groups include a polymerizable organic radical, the resulting ester-containing halopolyalkylene is polymerizable. The following reaction scheme illustrates this conversion generally.

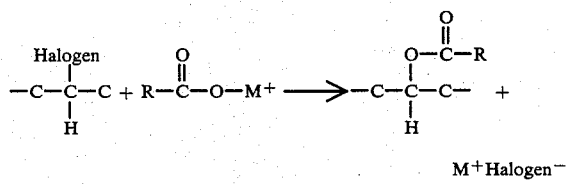

wherein R represents polymerizable and non-polymerizable organic radicals; and M represents a salt-forming radical.

Examples of salt-forming radicals represented by M include ammonium, sodium and potassium.

Examples of polymerizable organic radicals represented by R include:

(1) branched or non-branched polyenyl groups containing from 4 to about 30 carbon atoms or more, for example, butadienyl, pentadienyl, hexadienyl, heptadienyl, octadienyl, decadienyl, pentadecadienyl, octadecadienyl and octadecatrienyl, eicosadienyl, eicosatrienyl, eicosatetraenyl and the like, which groups may be substituted as described below:

(2) branched or non-branched alkynyl groups containing from 2 to about 30 carbon atoms or more, for example, ethynyl, propynyl, butynyl, pentynyl, hexynyl, heptynyl, octynyl, nonynyl, decynyl, dodecynyl, pentadecynyl, eicosynyl, triacontrynyl and the like, which groups may be substituted.

(3) aryl groups, whether singly or in fused ring systems, having polyenyl and/or alkynyl substituent groups, for example, dienyl and/or alkynyl substituted phenyl, biphenyl, naphthyl and the like, such as octadecadienylbenzene and such as ethynylbenzene which groups may be substituted;

(4) arpolyenyl groups, for example, phenylhexadienyl, phenyldodecadienyl, phenyloctadecatrienyl and the like, which groups may be substituted;

(5) aralkynyl groups, for example, phenylbutynyl and the like which groups may be substituted; and (6) cyclopolyenyl groups containing from about 4 to about 8 carbon atoms, for example, cyclobutadienyl, cyclopentadienyl, cyclohexadienyl, cyclooctatrienyl and the like, which groups may be substituted.

Examples of non-polymerizable organic radicals represented by R include:

(1) branched or nonbranched alkyl groups containing from 1 to about 30 carbon atoms or more, for example, methyl, ethyl, propyl, butyl, amyl, hexyl, heptyl, octyl, nonyl, decyl, dodecyl, tetradecyl, hexadecyl, octadecyl, eicosyl, pentacosyl, triacontyl and the like, which groups may be substituted;

(2) cycloalkyl groups containing from 3 to 8 carbon atoms, for example, cyclopropyl, cyclobutyl, cyclopentyl, cyclohexl, cycloheptyl, cyclooctryl and the like, which groups may be substituted;

(3) branched or non-branched alkenyl groups having a single internal carbon-carbon double bond and containing from 4 to about 30 carbon atoms or more, for example, butenyl, pentenyl, hexenyl, heotenyl, octenyl, nonenyl, decenyl, dodecenyl, pentadecenyl, eicosenyl, triacontenyl, and the like, wherein the carbon-carbon double bond is an internal double bond, which groups may be substituted;

(4) aryl groups, whether singly or in fused ring systems, for example, phenyl, biphenyl, naphthyl and the like, which groups may be substituted;

(5) aralkyl groups, for example, benzyl, phenylethyl, phenylhexyl, phenyloctyl, phenyldodecyl, naphthyldecyl, phenylheptadecyl and the like, which groups may be substituted;

(6) alkaryl groups, for example, methylphenyl, propylphenyl, styryl and the like, which groups may be substituted;

(7) heterocyclyl groups, for example, furanyl, thiophenyl, pyrryl, isozazolyl, oxazolyl, thiazolyl, thiazolinyl, thiazclidinyl, pyrazolyl, imidazolyl, pyranyl, pyridinyl, oxazinyl, diazinyl and the like, which groups may be substituted;

(8) condensed ring groups, for example, indyl, anthracyl, phenanthryl and the like, which groups may be substituted;

(9) carboxyl groups, e.g. $-C(=O)O-$ and derivatives thereof such as the esters, ethers, alkali metal and ammonium salts and the like; $-C(=O)S-$ and similar derivatives thereof; $-C(=S)O-$ and similar derivatives thereof; and $-C(=S)S-$. Such groups may be further substituted as described below.

It should be noted that while alkenyl groups in general are considered polymerizable, for purposes of this invention it has been found that alkenes having a single internal carbon-carbon double bond i.e., not a terminal double bond, do not readily polymerize under the conditions set forth herein. For example, where relatively pure oleic acid was utilized to replace chlorides of a chloropolyethylene (24% chloride) and the oleic ester-containing halopolyethylene was subjected to free radical polymerization conditions, very little increase in molecular weight was observed and the activity thereof as a cold flow improver was not much greater than the oleic ester-containing chloropolyethylene which was not subjected to free radical polymerization conditions. However, it is contemplated that alkenes having a single terminal carbon-carbon double bond may readily polymerize in a manner equivalent to polyenes.

Wherein it is indicated that the above described groups may be substituted, it is contemplated that the substituents may be aryl, halo, heterocyclyl, amino, amido, acetamido, benzamido, carbonyl, cyano, ester, nitro, nitroso, nitrile, sulfonyl, sulfonamide, benzenesulfonyl, benzenesulfonamide, thio, phospho, phosphono, phosphoro, phosphonamide, and the like. Where the substituent groups are positioned at or near the point of polymerizable functionality, preferable substituent groups are those which will stabilize an intermediate radical formed during the free radical polymerization process. Examplary preferable substituent groups positioned at or near the point of free radical formation include aryl, ester, nitrile and halide groups.

Carboxylic acids having the same or different R groups may be utilized in the practice of this invention to produce ester-containing halopolyalkylenes wherein the ester groups contain different organic radicals. Furthermore, not all of the carboxylic acids utilized to prepare the ester-containing halopolyalkylenes need contain a polymerizable organic radical. A mixture of polymerizable and non-polymerizable carboxylic acids may be utilized and this technique can be utilized to control the molecular weight of the oligomers. For example, utilization of a mixture of unsaturated and polyunsaturated fatty acids having from about 12 to about 24 carbon atoms produces a readily polymerizable ester-containing halopolyalkylene.

Thus, where at least some of the ester groups attached to the polyethylene contain a polymerizable organic radical, a polymerizable ester-containing halopolyalkylene is achieved.

Preferable carboxylic acids having a polymerizable organic radical include fatty acids and mixtures of fatty acids, at least some of which are poly-unsaturated, such as, for example, linoleic acid and such as linolenic acid. Other polyunsaturated fatty acids and mixtures of polyunsaturated fatty acids may also be used, for example, arachidonic acid and mixtures of linoleic, linolenic, and arachidonic acids. Advantageously, the percentage of polyunsaturated fatty acids based on the total weight of acid used is from about 15% to about 90%, and preferably from about 25% to about 75%. Furthermore, it is contemplated that other carboxylic acids having other polymerizable organic radicals as defined above may also be used. In practice, these carboxylic acids are reacted in salt forms such as sodium and potassium salts.

In the composition of this invention, at least about 0.001% of the halogens are replaced, such as from about 0.001% to 99% of the halogens are replaced, for example, from about 0.01% to 80% of the halogens are replaced, but preferably from about 0.015% to 75%. The structure of the product is a combination of halogenated polyalkylene and alkylene-vinyl ester copolymer in the same molecule. In addition there is olefinic unsaturation in the polyalkylene backbone due to elimination of hydrogen halide, for example, elimination of HCl. NMR analysis gives a quantitative determination of the structure since it determines the ratio of halogen to ester to olefin because the adjacent hydrogens to those structural groups are well separated in the NMR.

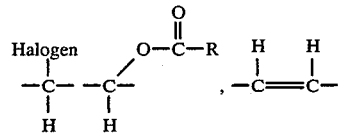

The product has a unique structure of a partially halogenated alkylene-vinyl ester copolymer with some olefinic unsaturation in the backbone and some polyunsaturation in the ester groups. In the case of linear polyethylene, these materials differ radically from normal EVA structures because they contain polymerizable ester groups and the backbone is totally linear while ethylene-vinyl ester copolymers do not contain such ester groups and have substantial branching.

A problem that exists is that the mild basicity of sodium carboxylates leads to a certain amount of elimination of hydrogen halide, such as HCl, from the backbone of the polymer to form internal olefin. This reaction competes with the substitution reaction. The formation of internal olefin on the polymer backbone is known to be harmful to its cold flow activity and this side reaction must be minimized. This elimination side reaction varies depending on temperature, solvent and structure of the carbcoxylate anion. It is difficult to eliminate this reaction completely and as far as cold flow activity is concerned it is necessary to make up in substitution what is lost by olefin formation. In general the ratio of substitution to elimination ranges from 3/1 to 6/1.

The conversion of halogenated polyalkylene to an alkylene-vinyl ester type copolymer is not a simple task because the sodium and potassium salts of carboxylic acids are not soluble in the common nonpolar solvents that dissolve halogenated polyalkylenes. This incompatibility problem can be handled in three ways.

1. The reaction can be carried out in a nonpolar solvent in the presence of a crown ether (such as 18-crown 6) which essentially solubilizes the metal ion carboxylate in the organic medium and allows for a homogeneous reaction.

2. The reaction can also be carried out in the presence of a phase transfer catalyst system. This entails dissolving the metal ion carboxylate and an oil-water soluble quaternary ammonium compound in water and conducting a two phase reaction with the halogenated polyalkylene dissolved in a nonpolar organic solvent. The reaction proceeds because the quaternary ammonium salt transfers the carboxylate anion as part of its own structure to the organic phase so that the actual reaction proceeds homogeneously.

3. The reaction can be carried out in a solvent mixture where there is partial solubility of both the halopolyalkylene and the salt of the organic acid.

The first two reaction methods are less economical because of the high cost of crown ethers and quaternary ammonium compounds. Method three is the most economically feasible method for commercial practice.

It has been found that solvent mixtures comprising blends of alcohols and blends of alcohols and ketones (ethyl cellosolve/methyl isobutyl ketone, methyl carbitol/diisobutyl ketone) allow the displacement reaction to be conducted in an effective manner.

Non-limiting examples are set forth below for illustrative purposes only and represent the best mode for preparing the polymerizable ester-containing halopolyalkylenes of the present invention.

EXAMPLE 1

A mixture of 40 grams of chlorinated linear polyethylene (19.4% Cl), 49.2 grams of INDUSTRENE ® 224 fatty acid (acid No. 200)*, 11.65 grams of 85% potassium hydroxide, 19 grams of Solvent 14 (trimethylbenzene/xylene), and 40 grams of ethyl carbitol was stirred and heated to 160° C. under nitrogen. Approximately 6 ml of a mixture of solvent and water were removed during the heating process. After 20 hours, an IR spectrum of the mixture indicated a strong carbonyl absorption at 1740 cm$^{-1}$ (ester) and the absence of fatty acid potassium salt (1550–1600 cm$^{-1}$). The reaction mixture was cooled to 120° C. and 49 grams of Solvent 14 were added. Forty grams of water were added and the mixture was stirred for 5 minutes and then allowed to settle. The lower aqueous salt solution was separated and the upper organic layer was filtered. The filtered product was dried by azeotropic distillation of any remaining water and its concentration was adjusted to 50% active solids.

*INDUSTRENE 224 ® is a distilled liquid fatty acid comprising oleic, linoleic, linolenic and eicosenic acids supplied by Humka Chemical Division, Witco Chemical Corporation of Memphis, TN.

EXAMPLE 2

A mixture of 20 grams of chlorinated linear polyethylene (19.4% Cl), 30.9 grams of a fatty acid (acid No. 180)*, 6.5 grams of 85% potassium hydroxide, 9.9 grams of Solvent 14, and 15 grams of ethyl carbitol was stirred and heated under nitrogen to 165° C. Approximately 3 ml of a mixture of solvent and water were removed during the heating process. After 20 hours, an IR spectrum of the mixture indicated a strong carbonyl absorption at 1740 cm$^{-1}$ (ester) and the presence of a small amount of fatty acid potassium salt (1560 cm$^{-1}$). The reaction mixture was cooled to 120° C. and 39 ml of Solvent 14 were added. Twenty ml of water were added and the mixture was stirred for 5 minutes and then allowed to settle. The lower aqueous salt solution was separated and the upper organic layer was filtered. The filtered product was dried by azeotropic distillation of any remaining water and its concentration was adjusted to 50% active solids.

*This particular fatty acid is a fatty acid comprising mainly oleic and linoleic acids in approximately equal amounts.

It is contemplated that other polymerizable ester-containing halopolyalkylenes can be prepared according to the procedures set forth in these examples by simply substituting for the carboxylic acids therein other carboxylic acids wherein at least some of such carboxylic acids contain a polymerizable organic radical. Furthermore, it is contemplated that these other polymerizable ester-containing halopolyalkylenes will be useful in preparing oligomers for use in fuel oil where such others, when subjected to the oligomerization conditions set forth below, will yield an oligomer which is soluble in fuel oil and which is effective as a cold flow improver. It is contemplated that such other carboxylic acids are those which include a polymerizable organic radical. Such other polymerizable organic radicals may include other polyenyl radicals, alkenes having a terminal carbon-carbon double bond, alkynyl, aryl having polyenyl and alkynyl substituents, arpolyenyl, aralkynyl, and cyclopolyenyl radicals as described above.

These polymerizable ester-containing halopolyalkylenes are useful for preparing ester-containing halopolyalkylenes of higher molecular weight and are particularly useful for preparing cold flow improving oligomers.

Oligomerization

The cold flow improving oligomers of the present invention are produced by subjecting the polymerizable ester-containing halopolyalkylenes described above to free radical conditions in the presence of an effective gelation preventing amount of a chain transfer agent.

Free radical catalysts which are useful in the reaction include commercially available azo and inorganic and organic peroxide initiators such as ammonium acetate, hydrogen peroxide, dilauroyl peroxide, t-butyl peroxide, 2,2-di(butylperoxy)butane, dicumyl peroxide, 2,2-azobis(2-methyl propionitrile),2-butylazo-2-cyanobutane, 4(t-butylperoxycarbonyl)-3-hexyl-6-(7-(t-butylperoxycarbonyl)heptyl)-cyclohexane and the like.

Preferred catalysts include hydrogen peroxide, di-t-butyl peroxide, dibenzoyl peroxide, diacetyl peroxide, dilauroyl peroxide, t-butyl perbenzoate, 2,2-azobis-(2-methyl propionitrile), 2-butylazo-2-cyanobutane, 4-(t-butylperoxycarbonyl)-3-hexyl-6-(7-butylperoxycarbonyl) heptyl)-cyclohexane and the like.

Advantageous catalysts include di-t-butyl perioxide, dibenzoyl peroxide, diacetyl peroxide, dilauroyl peroxide, t-butyl perbenzoate, t-amyl peroctanoate, dicumyl peroxide and the like.

In general, the preferred catalysts are organic peroxides which decompose between about 50° and 140° C. and are known to induce grafting. The catalyst may comprise from about 0.10 to about 5% by weight of the monomer added, preferably 0.25–3% by weight of the monomer added. Advantageously, the catalyst comprises from about 0.5 to about 2% by weight of the monomer added.

It should be noted that the amount and the strength of the catalyst material will, in certain instances, determine the final molecular weight of the oligomer. Furthermore, the amount of polymerizable ester groups contained on the halopolyalkylene backbone will further determine the final molecular weight. For example, where 2% by weight of monomer of t-butyl perbenzoate is utilized to catalyze a highly polymerizable ester-containing halopolyalkylene, the molecular weight of the polymer produced is so high that the polymer material is in the form of a gel. Gelatinaceous polymer materials are very difficult to dissolve in fuel oil and are therefore not preferred as cold flow improvers. However, chain transfer agents can be utilized to prevent formation of very high molecular weight polymers, i.e., to prevent oligomerization from proceeding to the gelation point, so that such catalysts and such highly polymerizable halopolyalkylenes may be utilized in the practice of the present invention.

Suitable chain transfer agents for use in the oligomerization process of the present invention to prevent gelation are those which are oil soluble and which consume free radicals without generating or forming other free radicals. The carboxylic acids containing polymerizable organic radicals as defined above provide covenient and readily available chain transfer agents. Thus, the carboxylic acids containing polymerizable R groups as defined above are the preferred chain transfer agents. For example, where a mixture of unsaturated and polyunsaturated fatty acids having from aobut 12 to about 24 carbon atoms is utilized to convert a halopolyalkylene to a polymerizable ester-containing halopolyalkylene, such fatty acids can also be readily and conveniently utilized as chain transfer agents to control the molecular weight of the oligomer. Other chain transfer agents are well known in the art and can also be utilized.

The temperature of the reaction may be from about 50° C. to 140° C., preferably from about 80° C. to about 120° C., especially from about 90° C. to about 110° C. Ideally, the temperature is chosen to be equal to the 10 hour half-life temperature of the catalyst.

The reaction may be conducted in bulk or in solution over a period of time from about 2 to about 10 hours under ambient pressure conditions.

The following non-limiting examples are for illustrative purposes only and represent the best mode for preparing the oligomers of the present invention.

EXAMPLE 3

A 100 gram sample of an ester-containing chloropolyethylene (chloropolyethylene [19.4% Cl]+0.8 eq. INDUSTRENE 224 fatty acid [acid No. 180]+0.8 eq. potassium hydroxide) which was 50% active was charged into a three necked round bottomed flask. A slow stream of nitrogen was continuously passed through the flask and 4.0 g of INDUSTRENE 224 fatty acid were added to the stirred solution and the solution was heated to 160° C. A solution of 1.6 g of di-t-butyl peroxide in 3.2 g of Solvent 14 was prepared. One-fourth (1.2 g) of the prepared peroxide solution was added to the reaction mixture. One hour later, another one-fourth of the prepared peroxide solution was added to the reaction mixture and every hour after that another quarter portion was added until the entire 4.8 g had been added. Several hours later, the product was allowed to cool to room temperature. It was lighter in color and more viscous than the original 100 gram sample.

EXAMPLE 4

A 100 gram sample of an ester-containing chloropolyethylene (chloropolyethylene [19.4% Cl]+0.8 eq. INDUSTRENE 224 fatty acid [acid No. 180]+0.8 eq. potassium hydroxide) which was 50% active was charged into a three necked round bottomed flask. A slow stream of nitrogen was continuously passed through the flask and the solution was heated to 160° C. A solution of 1.0 g of di-t-bytyl peroxide in 2.0 g of Solvent 14 was prepared. One-fourth (0.75 g) of the prepared solution was added to the reaction mixture. One hour later, another one-fourth of the prepared solution was added to the reaction mixture and every hour after that another quarter portion was added until the entire 3.0 g had been added. It was lighter in color and more viscous than the original 100 gram sample.

It is contemplated that other ester-containing halopolyalkylene oligomers can be produced utilizing the procedures set forth in these examples by substituting other polymerizable halopolyalkylenes for the ester-containing chloropolyethylene and by substituting other peroxide catalysts for di-t-butyl peroxide.

The ester-containing halopolyalkylene oligomers of this invention are very useful for improving the cold flow of fuel oils. Most hydrocarbon fuels yield crystals of solid wax as their temperature is lowered below the cloud point. In a usual distillate fuel oil composition containing a pour-point depressant addition agent, the crystals of solid wax do not hinder flow through pumps and filter screens even at temperatures well below the pour-point of the base oil, for example, distillate fuel oil. In such cases the crystals are small and therefore do not hinder flow. However, in some fuel blends the crystals which form are sufficiently large and dense so that an immobile layer of crystals is formed at the bottom of storage tanks. Such crystals of solid wax are not susceptible to treatment by most pour-point depressants tailored for distillate fuels and the crystals can therefore cause severe flow problems. Operability problems arise when it is attempted to pump the fuel from one location to another. Pump parts, filters, and the like tend to become clogged with the crystals of solid wax which concentrate in the fuel oil at the bottom of storage tanks.

As shown in Table 1, the oligomers of this invention advantageously improve operability and, particularly, pumpability. For example, an oligomer of an ester-containing halopolyalkylene of the above-defined characteristics is very active in modifying the wax crystals formed in or precipitated from troublesome fuels normally tending to form large dense crystals at lower temperatures. Although the formation of the wax is not actually inhibited when using an oligomer of this invention, the wax appears as a very finely divided fluffy material which should be pumpable under most conditions. Also, the oligomers of this invention are also useful as pour-point depressants as illustrated in Table 2.

A fuel oil composition of this invention comprises a major amount of a distillate fuel oil and, as an improved cold flow improver, an effective cold flow improving amount of an oligomer of an ester-containing halopolyalkylene. The oligomer is present in an amount, based on weight of fuel, of from about 1 to about 3,000 ppm, such as from about 10 to about 2,500 ppm, for example, from about 20 to about 2,000 ppm, but preferably from about 50 to about 1,500 ppm. The oligomer may be added directly to the fuel oil or may be formulated in concentrated form in a hydrocarbon solvent such as benzene, toluene, xylene, and the like. Additional suitable solvents are more specifically described herein below.

The fuel oil is a hydrocarbon oil such as, for example, a diesel fuel, a jet fuel, a heavy industrial residual fuel (e.g. Bunker C), a furnace oil, a heater oil fraction, kerosene, a gas oil, or any other like light oil. Of course, any mixtures of distillate oils are also intended. The distillate fuel oil may be virgin and/or cracked petroleum fractions. The distillate fuel oil may advantageously boil in the range of from about 120° C. to about 400° C. The distillate fuel oil may contain or consist of cracked components such as for example, those derived from cycle oils or cycle oil cuts boiling heavier than gasoline, usually in the range of from about 230° C. to about 400° C. and may be derived by catalytic or thermal cracking. High-sulfur-containing and low-sulfur-containing oils such as diesel oils and the like may also be used. The distillate oil may contain other components such as addition agents used to perform particular functions, for example, rust inhibitors, corrosion inhibitors, antioxidants, and/or sludge stabilizing compositions.

The preferred distillate fuel oils have an initial boiling point in the range of from about 120° C. to about 246° C. and an end point in the range from about 260° C. The distillate fuel oil may advantageously have an A.P.I. gravity of about at least 30 and a flash point (Tag closed cup) not lower than about 43° C. and preferably above about 46° C.

The oligomers of this invention may, for convenience, be prepared as concentrates as additives for fuels. Accordingly, an oligomer is dissolved in a suitable organic solvent therefor in amounts greater than 10% and preferably from about 10% to about 75%. The solvent in such concentrates may conveniently be present in amounts from about 25% to about 90%. The organic solvent preferably boils with the range of from about 38° C. to about 372° C. The preferred organic solvents are hydrocarbon solvents, for example, petroleum fractions such as naptha, heater oil, mineral spirits, and the like, aromatic hydrocarbons such as benzene, xylene and toluene, and paraffinic hydrocarbons such as hexane and pentane. The solvents selected should, of course, be selected with regard to possible beneficial or adverse effects they may have on the ultimate fuel oil composition.

thereof which are effective as cold flow improvers in middle distillate fuels.

The polyalkylenes utilized to produce the polymerizable ester-containing halopolyalkylenes of this invention have a molecular weight of from about 1,000 to 30,000, such as from about 1,500 to 10,000, but preferably from about 1,500 to 3,000, and a halogen content of from about 0.001% to about 40% by weight of polymer, such as from about 0.005% to about 30%, but preferably from about 0.01% to about 25%.

The percent of halogens replaced with ester groups can vary from about 1 to about 99 percent, such as from about 10 to about 80 percent, but preferably from about 15 to about 75 percent.

The polymerizable ester-containing halopolyalkylenes comprise ester groups containing an organic radical wherein at least some of the ester groups contain polymerizable organic radicals.

The invention also relates to use of the above polymerizable ester-containing halopolyalkylenes to produce ester-containing halopolyalkylenes of higher molecular weight.

The invention also relates to oligomers produced from the above polymerizable ester-containing halopolyalkylenes and to the use of such oligomers to improve cold flow in middle distillate fuels.

TABLE 1

Low Temperature Flow Test (LTFT)*

| Compound | Test Temp. (°C.) | Middle Distillate Fuel Oil[3] | Concentration (PPM) | Result (sec)++ | Milliliters of flow in 60 seconds |
|---|---|---|---|---|---|
| Example 3 | −13.3 | X | 1500 | 23 | |
|  | −14.4 | X | 1500 | 32 | |
|  | −15.6 | X | 1500 | 52 | |
|  | −18.9 | Y | 500 | 22 | |
|  | −20.0 | Y | 500 | 22 | |
|  | −21.1 | Y | 500 | F | 110 |
| Example 4 | −13.3 | X | 1500 | 30 | |
|  | −14.4 | X | 1500 | 37 | |
|  | −15.6 | X | 1500 | F | 90 |
|  | −21.1 | Z | 500 | 32 | |
|  | −22.2 | Z | 500 | F | 0 |
|  | −22.2 | Z | 500 | F | 0 |
| Example A[1] | −13.3 | X | 1500 | 37 | |
|  | −14.4 | X | 1500 | F | 100 |
|  | −14.4 | X | 1500 | 50 | |
|  | −18.9 | Y | 500 | F | 100 |
|  | −18.9 | Y | 500 | 26 | |
|  | −20.0 | Y | 500 | F | 160 |
|  | −21.1 | Z | 500 | 33 | |
|  | −22.2 | Z | 500 | F | 0 |
|  | −22.2 | Z | 500 | F | 0 |
| Example B[2] | −13.3 | X | 1500 | F | 40 |
|  | −13.3 | X | 1500 | F | 50 |
|  | −20 | Z | 500 | F | 150 |
|  | −20 | Z | 500 | F | 110 |

[1]Compound A is an oligomer of an ester-containing chloropolyethylene (19.4% Cl) + .9 eq. INDUSTRENE 224 + .9 eq. KOH) utilizing di-t-butyl peroxide as the catalyst.
[2]Compound B is the single-unit ester-containing chloropolyethylene of 1 without addition of catalyst.
[3]LTFT fail points for fuels X, Y and Z are respectively −10.0° C., −13.3° C. and −15.6° C.
*See Next Page
++See Next Page

TABLE 2

Pour Point Test (ASTM D-97)

| Compound | Middle Distillate Fuel Oil | Concentration (PPM) | Pour Point Depression Below Natural Pour Point of Distillate Fuel, °C. |
|---|---|---|---|
| EXAMPLE A | J | 500 | 20 |
|  | J | 1000 | 27 |
|  | K | 500 | 20 |
|  | K | 1000 | 25 |
|  | L | 500 | 11 |
|  | L | 1000 | 22 |

In summary, this invention relates to polymerizable ester-containing halopolyalkylenes and to oligomers The oligomers have a molecular weight of from about 1,000 to about 131,000, preferably from about 2,400 to about 9,000, and advantageously from about 3,000 to about 6,000.

The amount of oligomer employed as a pour-point depressant based on weight of fuel is from about 1 to about 3,000 ppm, such as from about 10 to about 2,500 ppm, for example from about 20 to about 2,000 ppm, but preferably from about 50 to about 1,500 ppm.

The amount of oligomer employed as an operability improver will in general be slightly more than the amount utilized as a pour-point depressant in the same fuel and can range from about 3 to about 4,000 ppm, such as from about 15 to about 3,000 ppm, for example from about 25 to about 2,500 ppm, but preferably from about 60 to 2,000 ppm.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

What is claimed is:

1. Composition comprising an oligomer of a polymerizable ester-containing halopolyalkylene, said oligomer being characterized by olefinic unsaturation in its backbone.

2. Composition of claim 1 wherein said polymerizable halopolyalkylene is characterized by the presence of ester groups containing polymerizable organic radicals.

3. Composition of claim 2 wherein said polymerizable organic radical is selected from the group consisting of polyenyl, alkynyl, polyenyl and alkynyl substituted aryl, arpolyenyl, aralkynyl or cyclopolyenyl radicals.

4. Composition of claim 2 wherein said polymerizable organic radical is selected from the group consisting of polyenyl or cyclopolyenyl radicals.

5. Composition of claim 2 wherein said polymerizable organic radical is selected from the group consisting of polyenyl or alkynyl radicals.

6. Composition of claim 2 wherein said polymerizable organic radical is polyenyl.

7. Composition of claim 2 wherein said ester groups are derived from a mixture of polymerizable and non-polymerizable fatty acids having from about 12 to about 24 carbon atoms.

8. Composition of claim 2 wherein said ester groups are derived from a fatty acid mixture consisting essentially of oleic acid, linoleic acid, linolenic acid and eicosenic acid.

9. Process for preparing a composition of claim 1 which comprises subjecting a polymerizable ester-containing halopolyalkylene to bulk or solution oligomerization conditions of free radical catalysis at a temperature of from about 50° C. to about 140° C. at ambient pressure.

10. Process of claim 9 wherein said halopolyalkylene is subjected to free radical polymerization conditions in the presence of an effective gelation preventing amount of an oil soluble chain transfer agent.

11. The process of claim 10 wherein said chain transfer agent is a mixture of polymerizable and non-polymerizable fatty acids having from about 12 to about 24 carbon atoms.

12. Composition comprising a fuel oil and a composition of claim 1.

13. Method of improving cold flow of a middle distillate fuel which comprises adding to said fuel an effective cold flow improving amount of a composition of claim 1.

14. Method of claim 13 wherein said effective cold flow improving amount is an effective pour-point depressing amount.

15. Method of claim 14 wherein said effective cold flow improving amount is an effective operability improving amount.

* * * * *